INVENTOR.
IRVEN H. CULVER
BY Christie, Parker & Hale
ATTORNEYS.

United States Patent Office 3,606,794
Patented Sept. 21, 1971

3,606,794
AIR-DRIVEN GYROSCOPE ERECTION SYSTEM
WITH SEAL-FREE GIMBAL CONNECTIONS
Irven H. Culver, Playa Del Rey, Calif., assignor to Southwestern Industries, Inc., Los Angeles, Calif.
Filed Apr. 28, 1969, Ser. No. 819,765
Int. Cl. G01c 19/12
U.S. Cl. 74—5.43
10 Claims

ABSTRACT OF THE DISCLOSURE

An erecting system for a vertical gyroscope useful in aircraft attitude-indicating instruments and the like. A gimbal-supported housing in the gyro encloses a gyro rotor, and is supplied with air which drives the rotor. Air is exhausted from the housing through four downwardly directed outlet ports at the corners of the housing undersurface. Control vanes are pendulously supported on the housing and extend beneath the outlet ports to intercept the exhaust air streams and thereby impart torques to the gyroscope tending to erect the rotor spin axis into a substantially vertical position. Air passages through outer and inner gimbals supply air to the housing, and the passages are configured so a pressure differential exists across a rotary connection between the inner and outer gimbals. A pressure drop occurs going from the outer gimbal to the inner gimbal or rotor housing, whereby air delivered to the rotor does not tend to leak outwardly through the rotary connection and the need for bulky and friction-producing seals is eliminated.

BACKGROUND OF THE INVENTION

A vertical gyroscope is a device providing a stabilized reference line which is maintained in a vertical position with respect to the earth. Vertical gyros are well known, and are widely used in attitude-indicating devices such as aircraft artificial-horizon instruments. Several types of known vertical or attitude gyros are shown in U.S. Pats. 2,425,300 and 2,602,334.

The vertical gyro has a rotor which spins about a substantially vertical axis with respect to the earth. The rotor is mounted on a shaft rotatably secured in a frame called an inner gimbal. The inner gimbal is rotatably secured to a second frame called an outer gimbal, and the outer gimbal is in turn rotatably secured to a frame or case which is rigidly fastened to an aircraft instrument panel. The gyro rotor is spun either by an electric motor or by a stream of air maintained by an external pump. Various forces encountered in flight tend to displace the rotor spin axis away from a true vertical, and a pendulous erecting mechanism is provided within the instrument to average and in effect neutralize these displacements.

The invention is concerned with an improved pneumatic system for an air-driven gyroscope using a pneumatic erection system. Several styles of air-operated erection systems are shown in the aforementioned patents, and these systems operate by laterally ejecting jets or streams of air through a plurality of spaced-apart ports in the housing or case enclosing the gyro rotor. Torques are applied to the rotor housing by the reaction forces of these air jets, and the gyro rotor precesses about an axis at right angles to an axis around which the torque is applied. The ports are spaced on the housing with respect to the gimbal axes of rotation so the resulting reaction forces cancel each other when the ports are equally open, and no net torque is applied to the gyroscope.

In these conventional systems, vanes are pendulously supported on the rotor housing and extend across the ports to restrict the flow of air therethrough. The vanes are arranged so the ports are equally restricted when the rotor axis of rotation is substantially vertical, and are unequally restricted when this axis drifts away from a vertically erect position. A net torque is applied to the gyro when the ports are unequally restricted, and the torque acts to precess the gyro and move the rotor axis of rotation back toward a vertical position. Various forces occurring during aircraft flight tend to move the rotor axis away from a vertical position, and it is the function of the erecting system to compensate for these errors and maintain the rotor axis in a substantially vertical position with respect to earth.

The term "vertical" is used in this application in the sense of an axis which is substantially upright or erect with respect to the earth. It is well known that certain gyroscope errors can be minimized as by tilting the gyro rotor axis a few degrees away from a truly vertical position. The advantages of such an inclination are discussed in the aforementioned U.S. Pat. 2,425,300. Vertical is thus herein used as referring to not only a precisely perpendicular orientation with respect to the earth, but also an axis which is substantially vertical or perpendicular to the earth within say three or four degrees.

A problem with known vertical gyroscopes is that they are relatively bulky devices which are difficult to assemble and maintain. The relatively large size of the gyroscope is a disadvantage in an aircraft instrument such as an artificial horizon because the instrument occupies an excessive amount of instrument-panel space which is normally at a premium. Much of the bulkiness of known pneumatically driven vertical gyros is due to projecting portions of the erecting system, and to the size of the surrounding case which must provide clearance for these components.

Known gyroscopes typically use two pairs of erection outlet ports, the ports being angularly spaced apart by 90° around the rotor spin axis. One pair of ports is typically positioned in a plane defined by the inner-gimbal axis and the rotor spin axis. The other pair of ports is positioned in a plane defined by the outer-gimbal axis and the rotor spin axis. This positioning of the ports complicates the mounting of the pendulous vanes as these members must be hung from the rotor housing to be freely movable and clear of interference with the immediately adjacent outer and inner gimbals and the rotary connection between these components.

One approach to solving this problem of physical interference of the gimbals and pendulous vanes is to construct the erection-system assembly as a substructure which extends beneath the rotor housing. This type of construction is shown in U.S. Pat. 2,425,300. The resulting gyroscope, however, is still relatively large, as the outer gimbal (as well as the case in which the gyro is mounted) must provide clearance for the erecting-system assembly which extends a considerable distance along the rotor spin axis. The outlet ports must also be spaced a considerable distance from the intersection of the gimbal axes with the rotor spin axis so the reaction force of the air jets will act over an adequate moment arm to provide the desired erecting torque. This factor, coupled with the problem of avoiding physical interference of the erecting vanes with the gimbal structure, has resulted in a relatively large gyro assembly which requires a large instrument case and an excessive amount of panel mounting space.

Another problem in conventional air-driven vertical gyros arises from the need for sealing of air passages which conduct air through the gimbal system to the rotor housing to spin the rotor. Loss of air from these passeges is undesirable as it affects the efficiency of the system, and may degrade the performance of the gyroscope at high altitudes. The conventional approach has been to provide seals at the rotational connections between the outer and inner gimbals. This technique, however, is not entirely satisfactory as the seals are bulky and complex and because they impose frictional forces on the gyroscope causing precession errors which must be corrected by the erection system.

Seals are needed in conventional air-driven gyros because pressure of the air stream flowing into the inner gimbal and rotor housing exceeds the pressure within the case surrounding the gimbals. The air stream is accelerated within a nozzle oriented generally tangentially to the rotor and mounted in the inner gimbal rotor housing to increase the stream velocity immediately before impinging on the rotor. Seals are needed at the rotational connection of the outer and inner gimbals to avoid an inside-out leakage flow which would bleed air out of the rotor case and decrease the energy available to drive the rotor and erection system.

The vertical gyroscope of this invention overcomes these problems, and is a compact assembly which occupies considerably less volume than known units. The erection system of the new gyroscope has outlet ports which are shifted 45° from the inner-gimbal axis to be positioned at the corners of the rotor housing. Both the control vanes and the outlet ports are thus located to avoid any interference with the physical connection of the outer and inner gimbals, and no enlargement of the gyroscope assembly is required to accommodate the erection system. The outlet ports extend through the bottom of the rotor housing, and the control vanes are pendulously hung from the corners of the housing to extend across the ports.

The need for sealing the air passage between the outer and inner gimbals is also eliminated in the new gyroscope by controlling the pressure of air flowing through these two parts. The air stream is accelerated before it leaves the outer gimbal so it flows perpendicularly to the rotor spin axis at high velocity and low pressure into the inner gimbal where the stream is turned or deflected to impinge tangentially on the rotor. The pressure of the air stream as it enters the inner gimbal is lower than the internal case pressure, and any leak through the gimbal bearings or rotary connections will accordingly be into the rotor housing rather than out of the rotor housing. This inward flow air does not adversely affect performance of the gyro, and seals on the bearings or other rotary connections can accordingly be eliminated.

SUMMARY OF THE INVENTION

The invention contemplates a vertical gyroscope having a frame, an outer gimbal mounted on the frame to be rotatable about a first axis, and an inner gimbal mounted on the outer gimbal to be rotatable about a second axis perpendicular to the first axis. The inner gimbal includes a hollow rotor housing, and a rotor is supported within the housing to be rotatable about a normally substantially vertical third axis perpendicular to the second axis. The inner and outer gimbals define air passages for conducting a stream of air into the housing to drive the rotor, and the housing has a plurality of outlet ports laterally spaced from the third axis for exhausting jets of air from the housing in a direction parallel to the third axis, the air-jet direction being downward when the third axis is substantially vertical. A plurality of control vanes are pendulously supported on and extend beneath the housing for differential interception of air issuing from the outlet ports to apply erecting torques tending to precess the gyroscope to maintain the vertical axis in a substantially vertical position.

A significant feature of the invention is the use of a seal-free rotary connection between the outer and inner gimbals. The air passages through the gimbals are configured so the air stream conducted therethrough is accelerated to high velocity before passing over any leakage path in the rotary connection. The increased in airstream velocity prior to entering the rotor housing reduces the pressure of the stream below the pressure of air outside the housing. Any leakage through the rotary connection is thus an outside-in leak into the housing which does not affect performance, and seals needed in conventional gyroscopes at this rotary connection are eliminated.

DESCRIPTION OF THE PREFERRED EMBODIMENT

Figure 1:
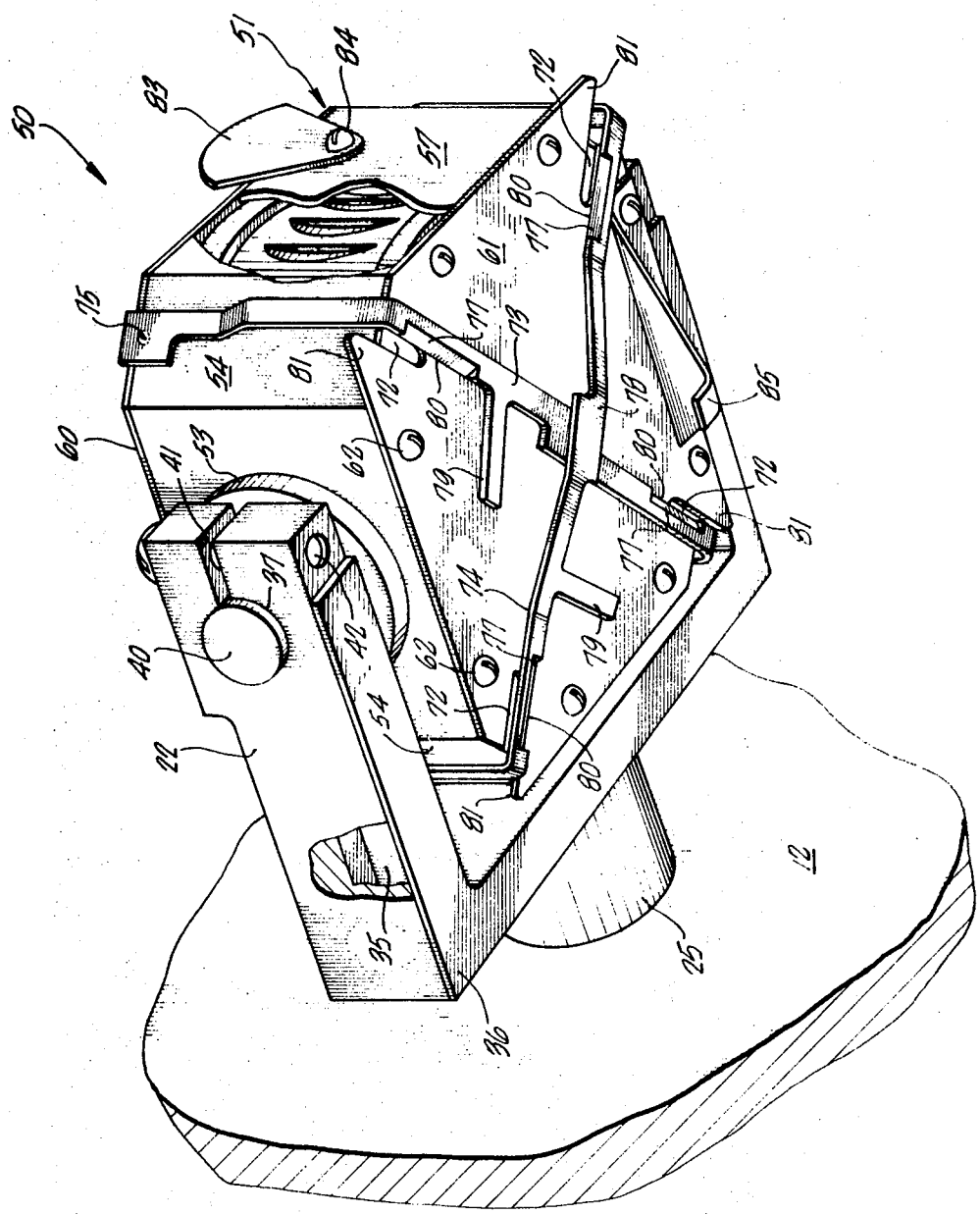
FIG. 1 is a perspective view showing the undersurface of a rotor housing of a gyroscope according to the invention.

Referring to the drawings, an attitude gyroscope 10 according to the invention is supported in an instrument case 11 by a rear frame plate 12. When the gyroscope is used as a component in an aircraft attitude-indicating instrument such as an artificial horizon, the case is adapted in conventional fashion for mounting on the aircraft instrument panel. Motion of the aircraft (and the instrument case and frame) around the stabilized gyroscope during flight maneuvers is displayed to the pilot via conventional linkages and indicator members which are omitted in the drawings for clarity. Several types of display mechanisms are shown in the aforementioned U.S. Pats. 2,425,300 and 2,602,334, and an improved linkage and display system is disclosed in my co-pending U.S. patent application Ser. No. 783,005, filed Dec. 11, 1968.

A rear cap 14 is secured by screws 15 to plate 12, and the cap has a central threaded opening 16 defining an air inlet. An air filter 17 is fitted within the cap, and is held in place by a snap ring 18. Air flows from opening 16 through the filter into a chamber 19 defined between cap 14 and plate 12, and subsequently flows through the gyroscope and is exhausted through an outlet opening 20 on the instrument case. As is conventional in instruments of this type, air under pressure can be delivered to opening 16 by a pump, or air can alternatively be drawn through the instrument by attaching a vacuum pump to outlet opening 20.

Attitude gyro 10 includes a generally U-shaped outer gimbal 22 having a central mounting shaft 23 rigidly secured thereto and extending rearwardly through an opening 24 in a central boss 25 on plate 12. A pair of ball bearings 26 are mounted at opposite ends of opening 24 in the boss, and the bearings are spaced apart by a stack of alternating spacer rings 27 and seal rings 28 forming a labyrinth seal between shaft 23 and plate 12. This seal minimizes leakage flow of air from chamber 19 through the bearings into the interior of the instrument case. The outer-gimbal shaft is held in place by a pair of lock nuts 29 secured against an inner race of rear bearing 26, and the outer gimbal is freely rotatable with respect to the instrument case and frame about an outer-gimbal axis of rotation 30.

Outer-gimbal mounting shaft 23 has a central bore 33 which terminates short of the forward end of the shaft in a plurality of laterally extending openings 34. A U-shaped channel 35 is formed in the lower part of the outer gimbal, and the bottom of the channel is closed by a U-shaped cover plate 36 secured across the bottom of the gimbal. Channel 35 extends forwardly along both sides of the outer gimbal to terminate at a bore 37 adjacent each end of the outer gimbal. A continuous air conduit or passage from chamber 19 through the outer gimbal to bores 37 is thus defined by bore 33, openings 34 and channel 35.

Figure 3:
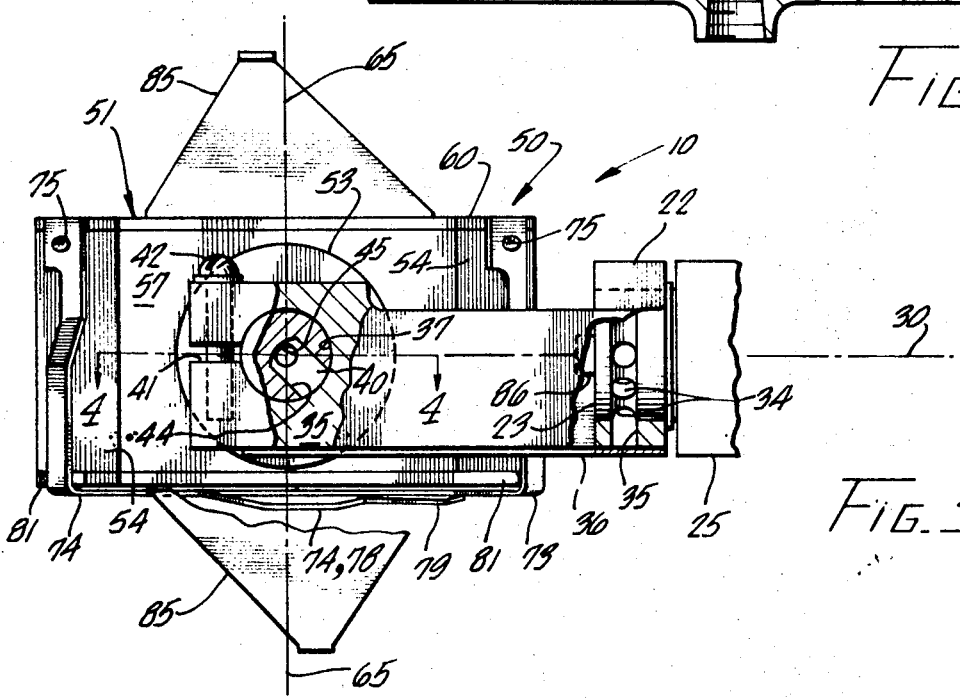
FIG. 3 is a side view, partly broken away, of the gyroscope.
Figure 4:
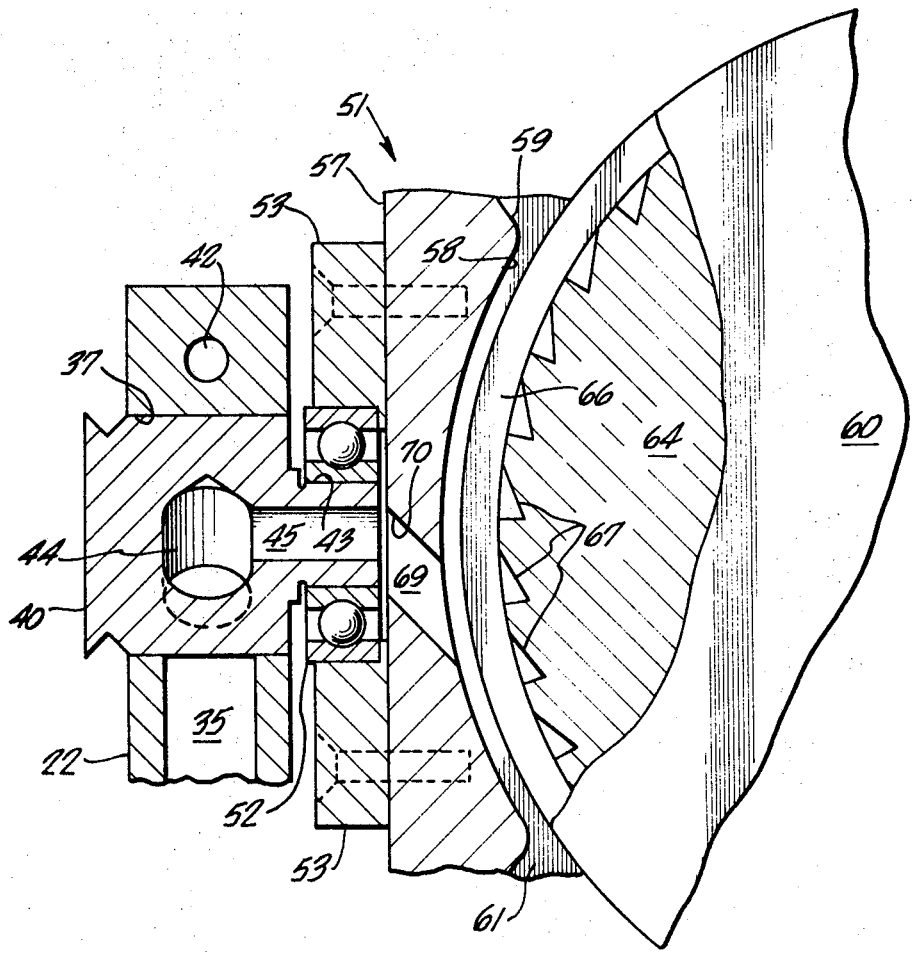
FIG. 4 is a top sectional view taken on line 4—4 of FIG. 3.

A pair of generally cylindrical nozzle pins 40 make a snug slip fit in bores 37 of the outer gimbal. A slot 41 is formed from each bore 37 to the adjacent end of the outer gimbal, and a clamp screw 42 extends through a clearance hole in the upper part of the outer gimbal into a threaded hole in the lower part of the outer gimbal to clamp the nozzle pin in place. The inner end of each nozzle pin is reduced in diameter to define an inner-gimbal mounting shaft 43. A lateral bore 44 extends part way through the nozzle pin, and (as best seen in FIGS. 3 and 4) the pin is positioned so bore 44 slopes downwardly to open into channel 35 in the outer gimbal. A central axial bore 45 extends from the inner end of shaft 43 into communication with inner end of lateral bore 44. Axial bore 45 is substantially smaller in diameter than lateral bore 44, and is about two-thirds the lateral-bore diameter which is typically about one-eighth inch.

An inner-gimbal assembly 50 includes a rotor housing 51 which is rotatably supported on inner-gimbal mounting shafts 43 by a pair of bearings 52. The bearings are seated in a pair of centrally apertured mounting plates 53 secured to opposite sides of the rotor housing. The rotor housing is generally square in plan form, but has beveled corners 54. The housing is rotatable with respect to the outer gimbal about an inner-gimbal axis of rotation 55 which is perpendicular to outer-gimbal axis 30.

Rotor housing 51 includes a hollow center member 57 having a cylindrical opening 58 extending therethrough. A semi-cylindrical opening 59 is formed within the center member adjacent each beveled corner 54, and each opening 59 opens into and extends radially away from central opening 58. Upper and lower cover plates 60 and 61 are secured by screws 62 to the top and bottom of center member 57 to form the rotor housing.

A gyro rotor 64 is fitted within opening 58 of the rotor-housing center member. The rotor is supported by conventional bearings (not shown) on upper and lower plates 60 and 61 to be rotatable about a rotor spin axis or axis of rotation 65 which perpendicularly intersects inner-gimbal axis 55 at the intersection of the inner and outer gimbal axes. The rotor is generally cylindrical, and has an annular channel 66 in its periphery, the floor of the channel defining teeth or buckets 67.

Figure 2:
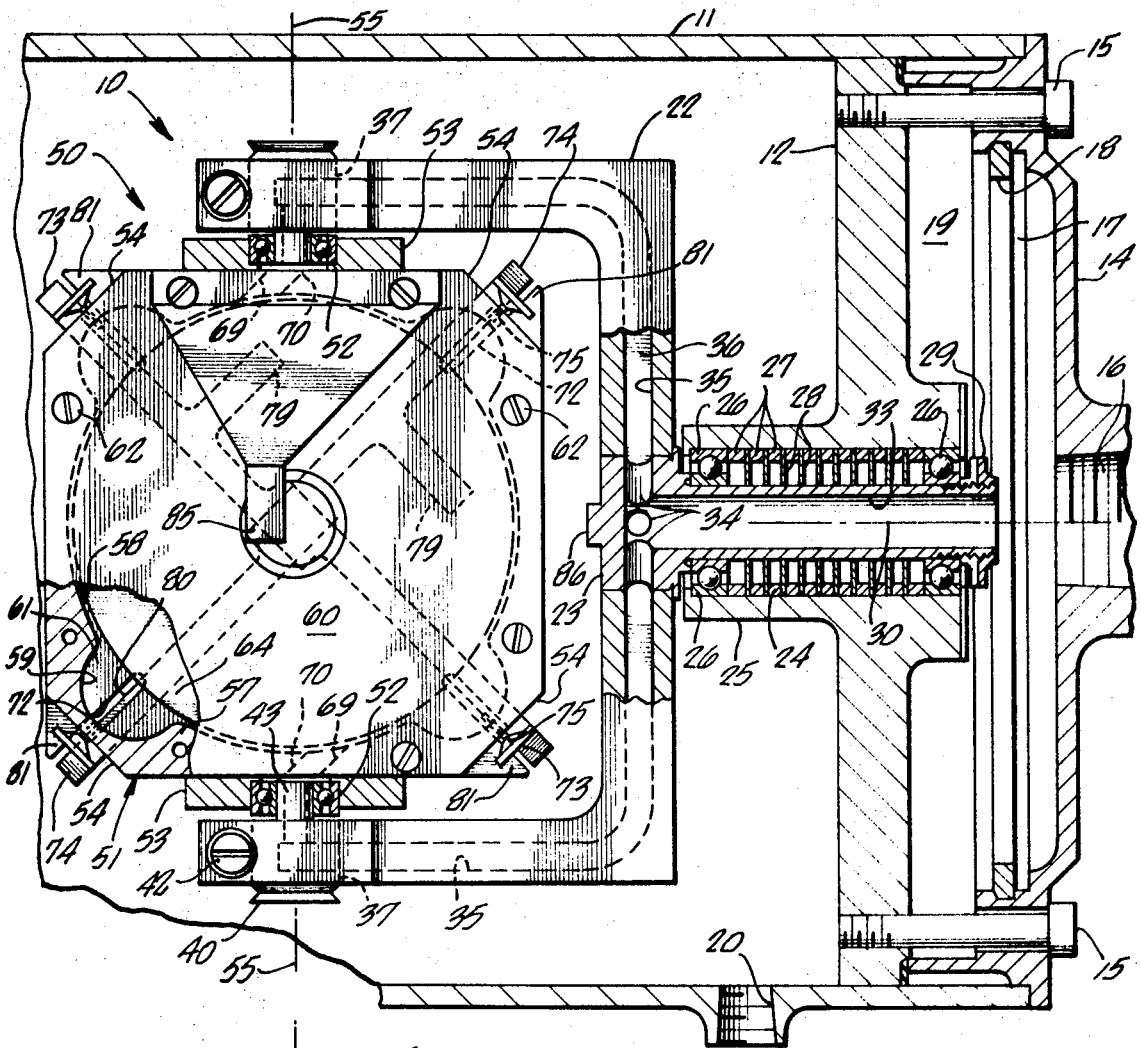
FIG. 2 is a top view, partly broken away and in section, of the gyroscope.

A pair of obliquely oriented circular-cross-section inlet openings 69 are formed through opposite sides of center member 57 midway between upper and lower plates 60 and 61. Openings 69 are about fifty percent larger in diameter than axial bores 45 in the nozzle pins, and have axes oriented at about 45° to the inner-gimbal axis and lying in a plane perpendicular to the rotor spin axis and containing the inner-gimbal axis. Air issuing from axial bores 45 of the nozzle pins strikes a wall 70 of each inlet opening to be turned and directed against buckets 67 of the gyro rotor. The rotor is thereby spun in a counterclockwise direction viewed from the top as seen in FIG. 2.

Each beveled corner 54 of rotor-housing lower plate 61 defines a slot or elongated outlet port 72 extending from the edge of the plate inwardly toward the rotor axis of rotation. A pair of generally U-shaped control vanes 73 and 74 are pendulously hung from pivot pins 75 adjacent the upper edge of each beveled corner of the rotor-housing center member. The control vanes extend at right angles to each other diagonally across and beneath lower plate 61, and have oppositely oriented knife-edge portions 77 positioned immediately below outlet ports 72. A center part 78 of vane 74 is bowed downwardly to pass beneath vane 73. A tab 79 extends perpendicularly from each control vane toward rear frame plate 12. The weight of the tabs shifts the center of gravity of the vanes slightly toward the rear frame plate (i.e., toward the nose of the aircraft in which the instrument is mounted) to produce a slight deviation of the rotor erection axis from an exact vertical for the reasons described in the aforementioned U.S. Pat. 2,425,300.

Each knife-edge portion 77 has an edge 80 which is centered over the immediately adjacent outlet port when the gyro is erected to the desired position. Each corner of lower plate 61 has a triangular extension defining a stop 81, and diagonally opposite stops are oppositely oriented to limit the total pendulous motion of control vanes 73 and 74. When the control vane is against one or the other stop, one knife-edge portion 77 is directly under the adjacent outlet port, and the other knife-edge portion is just removed from beneath the diagonally opposite outlet port.

A circular-sector or pie-shaped balancing weight 83 (see FIG. 1) is secured to the rotor housing, and similar weights (not shown) are positioned elsewhere on the rotor housing and on the outer gimbal to permit static balancing of the inner and outer gimbals. Each weight is held in place by a screw 84, and the weights are rotated around the screws until static balance of the gimbal assemblies is achieved. Preferably, the rotor case is balanced to be slightly bottom heavy so the rotor axis tends to be in a roughly vertical position when the instrument is not being operated. The slight bottom heaviness minimizes the spin-axis position correction which is made by the erection system when the rotor is brought up to speed.

A pair of tabs 85 extend upwardly and downwardly from upper and lower plates 60 and 61, respectively. The tabs are configured to abut a stop pin 86 formed on the inner end of mounting shaft 23 when the outer-gimbal axis of rotation approaches alignment with the rotor axis. Tabs 85 prevent these two axes from falling into exact alignment and causing a condition called gimbal lock in which one of the degrees of freedom of the gimbal system is lost.

In operation, air is drawn through the gyroscope by either connecting an air-pressure source to inlet opening 16 on the gyroscope case, or by coupling a suction pump to outlet opening 20 to draw ambient outside air through inlet opening 16. In either case, a differential pressure exists between the inlet and outlet openings, and air accordingly flows through the outer and inner gimbals to drive the rotor and erection system. The air-flow path is from inlet openings 16 through filter 17 into chamber 19, and then through central bore 33 and laterally extending openings 34 of the outer-gimbal mounting shaft into U-shaped channel 35 of the outer gimbal. Leakage of air from chamber 19 through bearings 26 into the interior of the case is minimized by the labyrinth seal formed by spacer rings 27 and seal rings 28.

Channel 35 is in the outer gimbal is relatively large in cross section, and air flows through the channel at high pressure and low velocity. When the air reaches nozzle pin 40, it is turned inwardly toward the inner gimbal and accelerated through central axial bore 45 of the pin which is relatively small in diameter. In accordance with Bernoulli's theorem, the air stream undergoes an increase in velocity and a decrease in pressure as it flows perpendicularly toward the rotor spin axis through the constriction or nozzle formed by bore 45.

The jet of low-pressure high-velocity air issuing from bore 45 impinges on and is turned by wall 70 of each inlet opening 69, and thereafter flows tangentially against buckets 67 to spin the gyro rotor. The air jet is further turned by the rotor itself, and flows in the annular space between the rotor and the walls of opening 58 in the rotor housing to pass into semi-cylindrical openings 59 at each corner of the rotor housing. The air then issues in four downwardly directed jets from outlet ports 72 into the interior of the instrument case and finally into outlet opening 20.

The central feature of the air-passage geometry through the rotary connection of the outer and inner gimbals is that the passage is restricted in the outer gimbal to accelerate the air to high velocity and low pressure before entering the rotor housing and before crossing the leakage path in the rotary connection. In the configuration shown in the drawings, this leakage path is through bearings 52. By accelerating the air prior to reaching the leakage path, the air pressure is reduced beneath the pressure within the case around the gyro, and any leakage flow is accordingly outside-in which does not affect performance. The need for bulky and friction-producing seals at the rotary connection is thereby eliminated. The pneumatic geometry of the invention contrasts sharply with conventional gyros which move air at high pressure and low velocity across the leakage path (which accordingly must be sealed) into the rotor housing where the air is accelerated in a nozzle oriented generally tangentially to the rotor.

When the inner gimbal is positioned so the rotor axis of rotation is perfectly erected, edges 80 of knife-edge portions 77 of the control vanes are positioned centrally beneath outlet ports 72, and the forces imposed on the inner gimbal by these jets cancel each other so no net torque is delivered by the erection system to the inner gimbal and rotor. If the rotor axis drifts away from a perfectly erected position, the resulting motion of the rotor housing with respect to the pendulously hung control vanes causes one outlet port 72 of each diagonally oriented pair of ports to be opened, and the other port of the pair to be restricted. The forces imparted by the air jets are then no longer cancelling, and a net erecting torque is imposed on the rotor housing and rotor to precess the rotor axis back to the desired position. As is conventional in instruments of this type, the erection system is designed to have a relatively slow erecting rate of say about four or five degrees per minute to average out any extraneous motion of the pendulous control vanes arising from rough-air flight, etc.

The elongated slots in lower plate 61 which define outlet ports 72 of the erection system are oriented along axes which are perpendicular to the rotor axis and shifted 45° from the inner-gimbal axis. The positioning of these outlet ports at the diagonally opposite corners of the generally rectangular rotor housing permits the control vanes to be hung on beveled corners 54 where they are spaced well clear of any interference with the rotary connection between the inner and outer gimbals. This positioning of the outlet ports also provides an adequate moment arm for the reaction force of the air jets issuing from the ports.

The control vanes are shaped to extend parallel to the undersurface of lower plate 61 so air issuing from the outlet ports flows perpendicularly against knife-edge portions 77. This perpendicular relationship avoids aerodynamic vorticity which can affect the operation of the erection system, and which may occur if the air-flow direction is oblique to the control vanes.

There has been described a vertical gyroscope which is relatively simple and economical to construct, and which occupies less space than known gyros as used in attitude-indicating instruments and the like. These properties arise from the novel construction of the air-flow passages at the rotary connection of the inner and outer gimbals, and from the geometry of the air-driven erecting mechanism.

What is claimed is:

1. In a vertical gyroscope having a gimbal-mounted rotor with an axis of rotation which is to be maintained substantially vertical, the gyroscope having mutually perpendicular outer and inner gimbal axes of rotation, an improved air-erecting system comprising:

a housing disposed around and rotatably supporting the rotor, the housing having an air inlet and having a plurality of downwardly directed outlet ports spaced from the rotor axis of rotation through which air is ejected in a direction parallel to the axis of rotation to apply normally cancelling erecting torques to the gyroscope, the outlet ports being arranged in two pairs, each pair of ports being disposed on opposite sides of the rotor axis of rotation along a port axis which is oblique to the inner-gimbal axis of rotation, the port axes of the two port pairs being perpendicularly oriented; and a plurality of vanes pendulously and pivotally supported on and extending beneath the housing for differential interception of air issuing from the outlet ports to apply erecting torques tending to precess the rotor axis of rotation to a substantially vertical position, the vanes being arranged to rotate around pivot axes which are adjacent a top surface of the housing to be spaced above a plane which contains the inner-gimbal axis of rotation and is perpendicular to the rotor axis of rotation whereby vertical separation of the pivot axes and air-intercepting portions of the associated vanes is substantially maximized.

2. A vertical gyroscope for an aircraft attitude-indicating instrument, comprising:

a frame;

an outer gimbal mounted on the frame to be rotatable about a first axis;

an inner gimbal mounted on the outer gimbal to be rotatable about a second axis perpendicular to the first axis, the inner gimbal defining a hollow rotor housing;

a rotor supported within the housing to be rotatable about a normally substantially vertical third axis perpendicular to the second axis;

the inner and outer gimbals defining air passages for conducting a stream of air into the housing to drive the rotor, and the housing having a plurality of outlet ports laterally spaced from the third axis for exhausting jets of air from the housing in a direction parallel to the third axis, the air-jet direction being downward when the third axis is substantially vertical, the outlet ports being arranged in pairs with the ports of each pair being disposed on opposite sides of the third axis along a port axis which is oblique to the second axis; and a plurality of vanes pendulously and pivotally supported on and extending beneath the housing for differential interception of air issuing from the outlet ports to apply erecting torques tending to precess the gyroscope to maintain the third axis in a substantially vertical position, the vanes being arranged to rotate around pivot axes which are adjacent a top surface of the housing to be spaced above a plane which contains the second axis and is perpendicular to the third axis whereby vertical separation of the pivot axes and air-intercepting portions of the associated vanes is substantially maximized.

3. The gyroscope defined in claim 2 in which the ports are arranged in two pairs, the third axis and the port axes of the two pairs being mutually perpendicular and the port axes being shifted about 45 degrees from the second axis.

4. The gyroscope defined in claim 3 in which the rotor housing is generally square when viewed along the third axis, the housing having beveled corners from which the vanes are hung, the rotor housing having a lower cover plate with elongated slots extending inwardly from each of the beveled corners toward the third axis to define the outlet ports, the cover plate having oppositely oriented stops extending therefrom adjacent each outlet port and positioned to limit total motion of the vanes.

5. The gyroscope defined in claim 4 in which the outer-gimbal air passage has a restricted portion defining a nozzle for accelerating the air into a high-velocity low-pressure stream directed toward the third axis, and in which the inner-gimbal air passage is of larger cross section than the restricted nozzle portion and is oriented to receive the accelerated air stream and turn it to impinge generally tangentially against the rotor.

6. The gyroscope defined in claim 5 and further comprising a pair of spaced-apart bearings mounted on the frame to support the outer gimbal, and a labyrinth seal disposed between the bearings and between the frame and outer gimbal.

7. In an air-driven gyroscope having outer and inner gimbals and a rotor rotatably supported in a housing on the inner gimbal, the outer gimbal having an air passage for conducting an air stream to drive the rotor, a seal-free rotary connection between the outer and inner gimbals comprising:
- a first member on the outer gimbal and having a nozzle passage therein in communication with the outer-gimbal air passage, the nozzle passage being configured to accelerate the air stream and thereby reduce the pressure of the air stream; and
- a second member on the inner gimbal making a rotational fit with the first member and having an opening therein to receive the air stream from the nozzle passage and direct the stream against the rotor, the first and second members having a gap therebetween defining a leakage path between the member passages and a space around the gyroscope;
- the nozzle passage being positioned upstream of the leakage-path gap whereby pressure of the air stream at the gap is less than pressure of air in the space around the gyroscope, and leakage flow of the stream through the gap is avoided.

8. The gyroscope of claim 7 in which the gimbals and rotor housing are supported within a case having an air inlet in communication with the outer-gimbal air passage and an air outlet through which air is exhausted after leaving the rotor; and in which the first member is a pin having a lateral opening in communication with the outer gimbal air passage, the pin further having an axial opening communicating with the lateral opening and defining the nozzle passage, the axial opening being of smaller cross section than the lateral opening and being oriented to direct the accelerated air stream toward a spin axis of the rotor; the opening in the second member being of larger cross section than the axial opening and being obliquely oriented thereto to turn the accelerated air stream within the rotor housing to impinge generally tangentially against the rotor.

9. The gyroscope of claim 8 in which the pin includes a portion defining a shaft extending from the outer gimbal toward the inner gimbal, and the second member includes a bearing mounted on the inner gimbal and fitted on the shaft, the leakage path being through the bearing.

10. The gyroscope of claim 9 in which the outer gimbal has a mounting shaft with a central bore defining a portion of the air passage, and further comprising a pair of spaced-apart bearings mounted on the case to support the outer-gimbal mounting shaft, and a labyrinth seal disposed around the shaft between the bearings.

References Cited
UNITED STATES PATENTS

| | | | |
|---|---|---|---|
| 2,174,777 | 10/1939 | Carter et al. | 74—5.43 |
| 2,180,221 | 11/1939 | Carter | 74—5.43UX |
| 2,368,058 | 1/1945 | Whatley | 74—5.43 |
| 2,392,494 | 1/1946 | Murtagh et al. | 74—5.43UX |
| 2,445,388 | 7/1948 | Carlson | 74—5.43 |
| 3,264,882 | 8/1966 | Nichols | 74—5.7 |
| 3,310,987 | 3/1967 | Huizinga et al. | 74—5.43 |

MANUEL A. ANTONAKAS, Primary Examiner

U.S. Cl. X.R.

74—5.8